(12) United States Patent
de Kadt et al.

(10) Patent No.: US 9,514,485 B1
(45) Date of Patent: Dec. 6, 2016

(54) LAUNCHING VIRTUAL MACHINE INSTANCES IN A PROGRAMMABLE EXECUTION SERVICE

(75) Inventors: Christopher de Kadt, Cape Town (ZA); Roland Paterson-Jones, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 1263 days.

(21) Appl. No.: 13/336,359

(22) Filed: Dec. 23, 2011

(51) Int. Cl.
*G06Q 10/00* (2012.01)
*G06Q 30/00* (2012.01)
*G06Q 30/02* (2012.01)
*G06F 11/34* (2006.01)

(52) U.S. Cl.
CPC ....... *G06Q 30/0283* (2013.01); *G06F 11/3442* (2013.01)

(58) Field of Classification Search
USPC ........................................................ 705/7.12
See application file for complete search history.

(56) References Cited

U.S. PATENT DOCUMENTS

| 8,095,929 | B1 * | 1/2012 | Ji et al. .............................. 718/1 |
| 2012/0304169 | A1 * | 11/2012 | Anderson ............. G06F 9/5077 718/1 |
| 2013/0031035 | A1 * | 1/2013 | Jeanne et al. ................... 706/12 |

* cited by examiner

*Primary Examiner* — George Chen
(74) *Attorney, Agent, or Firm* — Lee & Hayes, PLLC

(57) ABSTRACT

A component executing within a programmable execution system (PES) receives a request to launch a virtual machine instance, such as from a customer of the PES. In response to receiving such a request, the component computes an expected cost of executing the virtual machine instance over its lifetime based upon one or more cost factors. The component also computes an expected value of executing the virtual machine instance over its lifetime based upon one or more value factors. Based upon the computed expected cost and the computed expected value associated with executing the virtual machine instance, the component determines whether or not to launch the virtual machine instance. The component might utilize a similar mechanism to determine whether to instantiate other types of computing resources.

20 Claims, 8 Drawing Sheets

LAUNCHING VIRTUAL MACHINE INSTANCES IN A PROGRAMMABLE EXECUTION SERVICE

BACKGROUND

A programmable execution service ("PES") can provide computing resources for executing applications on a permanent or an as-needed basis. The computing resources provided by a PES may include various types of resources, such as data processing resources, data storage resources, data communication resources, and the like. Each type of computing resource may be general-purpose or may be available in a number of specific configurations. For example, data processing resources may be available as virtual machine instances ("instances"). The instances may be configured to execute applications, including World Wide Web ("Web") servers, application servers, media servers, database servers, and the like. Data storage resources may include file storage devices, block storage devices, and the like. Customers of a PES can typically purchase and utilize the computing resources provided by the PES according to various financial models.

When a customer of a PES requests to launch a new virtual machine instance, the PES typically identifies a "slot" for executing the new instance. The selection of a slot for executing the new instance might include identifying an appropriate server computer in an appropriate data center upon which the new instance should be executed. All execution slots are not the same, however. Consequently, the selection of a particular slot for executing certain virtual machine instances might cost the operator of the PES money, rather than providing an economic benefit to the operator of the PES. For instance, certain types of virtual machine instances might have associated licensing fees that require payment for an entire month even if the virtual machine instance is only executed for a portion of the month. In this case, launching a new instance on such a virtual machine for a customer might actually cost the operator of the PES more than the revenue generated by the execution of the virtual machine instance.

It is with respect to these and other considerations that the disclosure made herein is presented.

DETAILED DESCRIPTION

Figure 1:
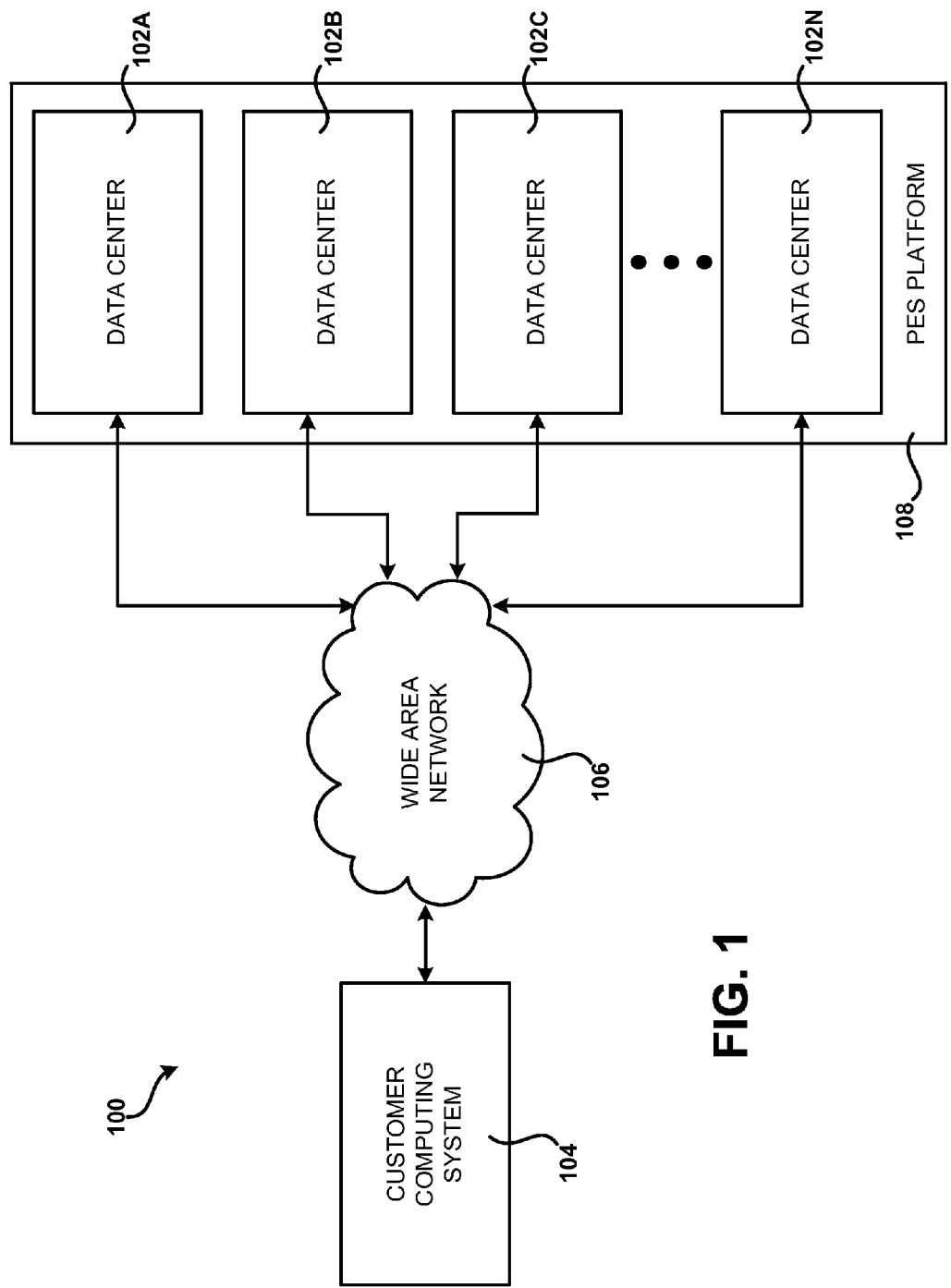
FIG. 1 is a system and network diagram showing aspects of one illustrative operating environment for the embodiments disclosed herein for launching virtual machine instances in a PES.

The following detailed description is directed to technologies for launching virtual machine instances in a PES. Utilizing the technologies described herein, an expected cost and an expected value associated with the execution of a virtual machine instance over its expected lifetime are determined prior to launching the instance. A determination can then be made as to whether the instance should or should not be launched based upon the expected cost of executing the instance and the computed expected value from the execution of the instance. In this way, virtual machine instances, or other types of computing resources, that do not provide an expected economic benefit to the operator of the PES may not be launched.

According to one aspect disclosed herein, a PES platform is configured to provide instances of computing resources for executing an application to customers of the PES. For example, the PES platform might provide virtual machine instances for executing an application, such as an e-commerce application or another type of distributed application. Software components that implement the application are typically deployed to the virtual machine instances provided by the PES platform. The PES might also provide other types of computing resources on-demand, such as data storage resources and data communication resources.

The PES platform is also provided with functionality for determining whether to launch a virtual machine instance based upon an expected value and an expected cost associated with executing the virtual machine instance. In particular, a component operating within the PES, such as a management component or a deployment component, is configured in one implementation to receive a request to launch a virtual machine instance. For example, a customer of the PES may request to launch a new virtual machine instance in the PES.

In response to receiving a request to launch a virtual machine instance, the component is configured to compute an expected cost of executing the virtual machine instance as a monetary or non-monetary value. For example, the component might compute the expected cost of executing the virtual machine instance over its expected lifetime using one or more cost factors. The cost factors might include, but are not limited to, the actual monetary costs associated with executing the virtual machine instance, opportunity costs associated with executing the virtual machine instance, a cost of risk associated with executing the virtual machine instance, and a cost of lost goodwill associated with executing the virtual machine instance.

The component might also compute an expected value from executing the virtual machine instance as a monetary or non-monetary value. For example, the component might compute the value to be derived from the execution of the virtual machine instance by the operator of the PES over the expected lifetime of the instance based upon one or more value factors. The value factors might include, but are not limited to, a customer-provided value indicator, expected income from execution of the virtual machine instance, value of goodwill associated with execution of the instance, and indirect income associated with execution of the virtual machine instance.

Once the component has computed the expected cost and the expected value of executing the virtual machine instance, the component might then determine whether or not to launch the virtual machine instance based upon the expected cost and the expected value. For example, the component may permit the instance to be launched on the PES only if the computed expected value from executing the virtual machine instance exceeds the computed expected cost of executing the virtual machine instance over its lifetime. In other embodiments, the component may permit the instance to be launched on the PES only if the computed expected cost of executing the virtual machine instance is less than a threshold percentage of the computed expected value from executing the virtual machine instance. Additional details regarding the various processes described above for launching a virtual machine instance in a PES will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 that includes a PES platform 108 (which may be referred to as a "PES 108") for providing on-demand access to computing resources, such as virtual machine instances. As will be described in greater detail below, the computing resources may be launched or otherwise instantiated based upon an expected cost and value of the computing resources to an operator of the PES platform 108.

The PES platform 108 can provide computing resources for executing applications on a permanent or an as-needed basis. The computing resources provided by the PES platform 108 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including Web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

The computing resources provided by the PES platform 108 are enabled by one or more data centers 102A-102N (which may be referred herein singularly as "a data center 102" or in the plural as "the data centers 102"). The data centers 102 are facilities utilized to house and operate computer systems and associated components. The data centers 102 typically include redundant and backup power, communications, cooling, and security systems. The data centers 102 might also be located in geographically disparate locations. One illustrative configuration for a data center 102 that implements the concepts and technologies disclosed herein for launching virtual machine instances will be described below with regard to FIG. 2.

The customers and other consumers of the PES platform 108 may access the computing resources provided by the data centers 102 over a wide-area network ("WAN") 106. Although a WAN is illustrated in FIG. 1, it should be appreciated that a local-area network ("LAN"), the Internet, or any other networking topology known in the art that connects the data centers 102 to remote customers and other users may be utilized. It should also be appreciated that combinations of such networks might also be utilized.

The customer computing system 104 is a computer utilized by a customer or other consumer of the PES platform 108. For instance, the customer computing system 104 may be a server computer, a desktop or laptop personal computer, a tablet computer, a wireless telephone, a PDA, an e-reader, a game console, a set-top box, or any other computing device capable of accessing the PES platform 108.

As will be described in greater detail below, the customer computing system 104 may be utilized to configure aspects of the computing resources provided by the PES platform 108. In this regard, the PES platform 108 might provide a Web interface through which aspects of its operation may be configured through the use of a Web browser application program executing on the customer computing system 104. Alternatively, a stand-alone application program executing on the customer computing system 104 might access an application programming interface ("API") exposed by the PES platform 108 for performing the configuration operations. Other mechanisms for configuring the operation of the PES platform 108, including launching new virtual machine instances on the PES platform 108, might also be utilized.

According to embodiments disclosed herein, the capacity of purchased computing resources provided by the PES platform 108 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of the PES platform 108 can be scaled on-demand.

Auto scaling is one mechanism for scaling computing resources in response to increases or lulls in demand for the resources. Auto scaling allows customers of the PES platform 108 to configure the platform 108 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in the PES platform 108.

The PES platform 108 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared, and other types of information. The deployment component utilizes the customer-provided configuration and cache warming logic to launch, configure, and prime new instances of computing resources.

Figure 2:
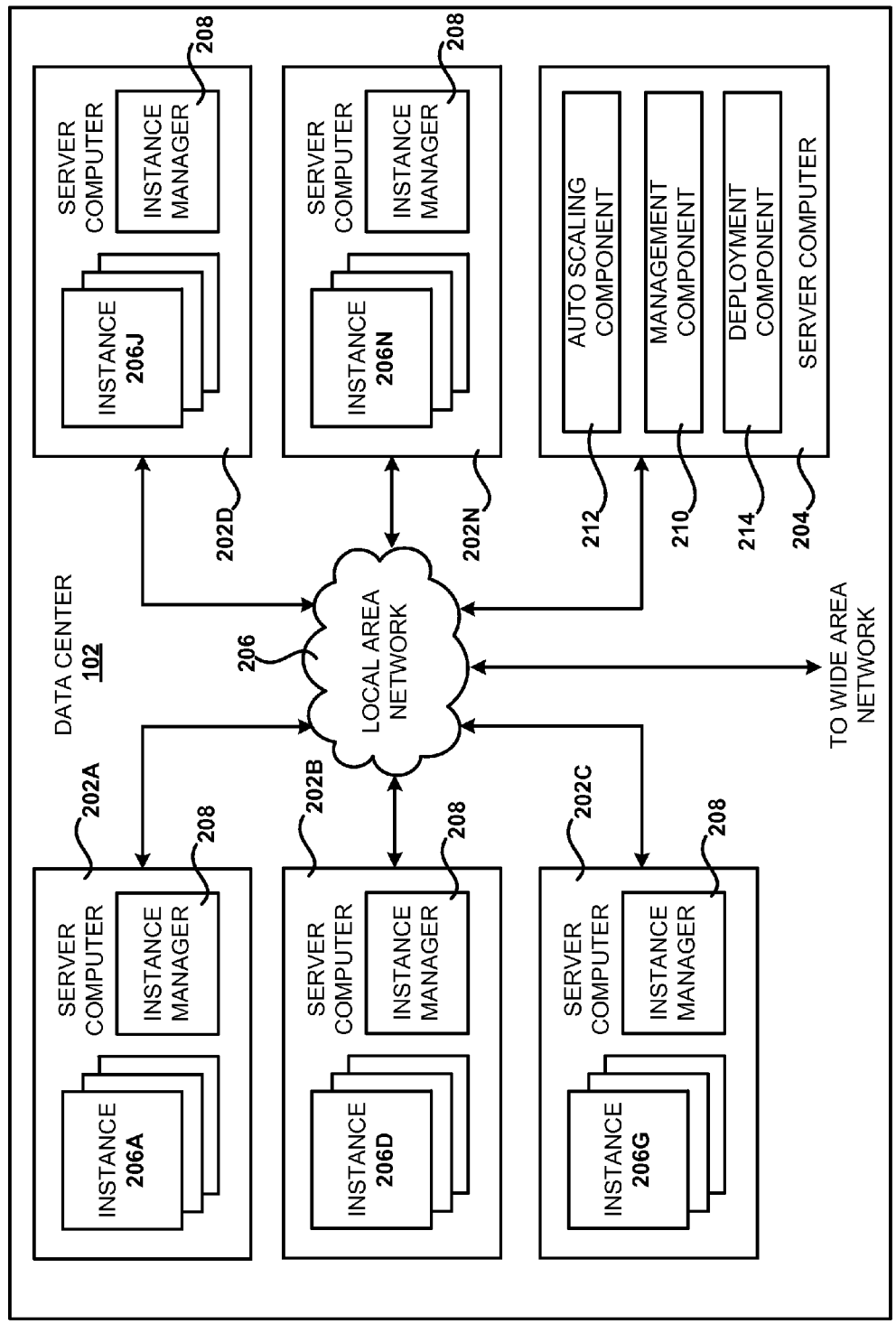
FIG. 2 is a computing system diagram that illustrates a configuration for a data center that implements the concepts and technologies disclosed herein for launching virtual machine instances in a PES, according to one embodiment.

FIG. 2 is a computing system diagram that illustrates one configuration for a data center 102 that implements a PES platform 108, including the concepts and technologies disclosed herein for launching a virtual machine instance. The example data center 102 shown in FIG. 2 includes several server computers 202A-202N (which may be referred herein singularly as "a server computer 202" or in the plural as "the server computers 202") for providing computing resources for executing an application. The server computers 202 may be standard tower or rack-mount server computers configured appropriately for providing the computing resources described above. For instance, in one implementation the server computers 202 are configured to provide instances 206A-206N of computing resources.

In one embodiment, the instances 206A-206N (which may be referred herein singularly as "an instance 206" or in the plural as "the instances 206") are virtual machine instances. As known in the art, a virtual machine instance is an instance of a software implementation of a machine (i.e. a computer) that executes programs like a physical machine. In the example of virtual machine instances, each of the servers 202 may be configured to execute an instance manager 208 capable of executing the instances. The instance manager 208 might be a hypervisor or another type of program configured to enable the execution of multiple instances 206 on a single server 202, for example. As discussed above, each of the instances 206 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein might be utilized with instances of storage resources, instances of data communications resources, and with other types of resources. The embodiments disclosed herein might also execute all or a portion of an application directly on a computer system without utilizing virtual machine instances.

The data center 102 shown in FIG. 2 also includes a server computer 204 reserved for executing software components for managing the operation of the data center 102, the server computers 202, and the instances 206. In particular, the server computer 204 might execute a management component 210. As discussed above, a customer of the PES platform 108 might utilize the customer computing system 104 to access the management component 210 to configure various aspects of the operation of PES platform 108 and the instances 206 purchased by the customer. For example, the customer may purchase instances and make changes to the configuration of the instances. The customer might also specify settings regarding how the purchased instances are to be scaled in response to demand. The customer might also provide requests to launch instances to the management component 210.

As also described briefly above, an auto scaling component 212 scales the instances 206 based upon rules defined by a customer of the PES platform 108. In one embodiment, for instance, the auto scaling component 212 allows a customer to specify scale up rules for use in determining when new instances should be instantiated and scale down rules for use in determining when existing instances should be terminated.

The auto scaling component 212 may execute on a single server computer 204 or in parallel across multiple server computers 202 in the PES platform 108. In addition, the auto scaling component 212 may consist of a number of sub-components executing on different server computers 202 or other computing devices in the PES platform 108. The auto scaling component 212 may be implemented as software, hardware, or any combination of the two. The auto scaling component 212 may monitor available computing resources in the PES platform 108 over an internal management network, for example.

As discussed briefly above, the data center 102 may also be configured with a deployment component 214 to assist customers in the deployment of new instances 206 of computing resources. The deployment component 214 may receive a configuration from a customer that includes data describing how new instances 206 should be configured. For example, the configuration might specify one or more applications that should be installed in new instances 206, provide scripts and/or other types of code to be executed for configuring new instances 206, provide cache warming logic specifying how an application cache should be prepared, and other types of information.

The deployment component 214 utilizes the customer-provided configuration and cache warming logic to configure, prime, and launch new instances 206. The configuration, cache warming logic, and other information may be specified by a customer using the management component 210 or by providing this information directly to the deployment component 214. Other mechanisms might also be utilized to configure the operation of the deployment component 210.

In the example data center 102 shown in FIG. 2, an appropriate LAN 206 is utilized to interconnect the server computers 202A-202N and the server computer 204. The LAN 206 is also connected to the WAN 106 illustrated in FIG. 1. It should be appreciated that the network topology illustrated in FIGS. 1 and 2 has been greatly simplified and that many more networks and networking devices may be utilized to interconnect the various computing systems disclosed herein. Appropriate load balancing devices or software modules might also be utilized for balancing a load between each of the data centers 102A-102N, between each of the server computers 202A-202N in each data center 102, and between instances 206 purchased by each customer of the PES platform 108. These network topologies and devices should be apparent to those skilled in the art.

It should be appreciated that the data center 102 described in FIG. 2 is merely illustrative and that other implementations might be utilized. In particular, functionality described herein as being performed by the management component 210, the auto scaling component 212, and the deployment component 214 might be performed by one another, might be performed by other components, or might be performed by a combination of these or other components. Additionally, it should be appreciated that this functionality might be implemented in software, hardware, or a combination of software and hardware. Other implementations should be apparent to those skilled in the art.

Figure 3:
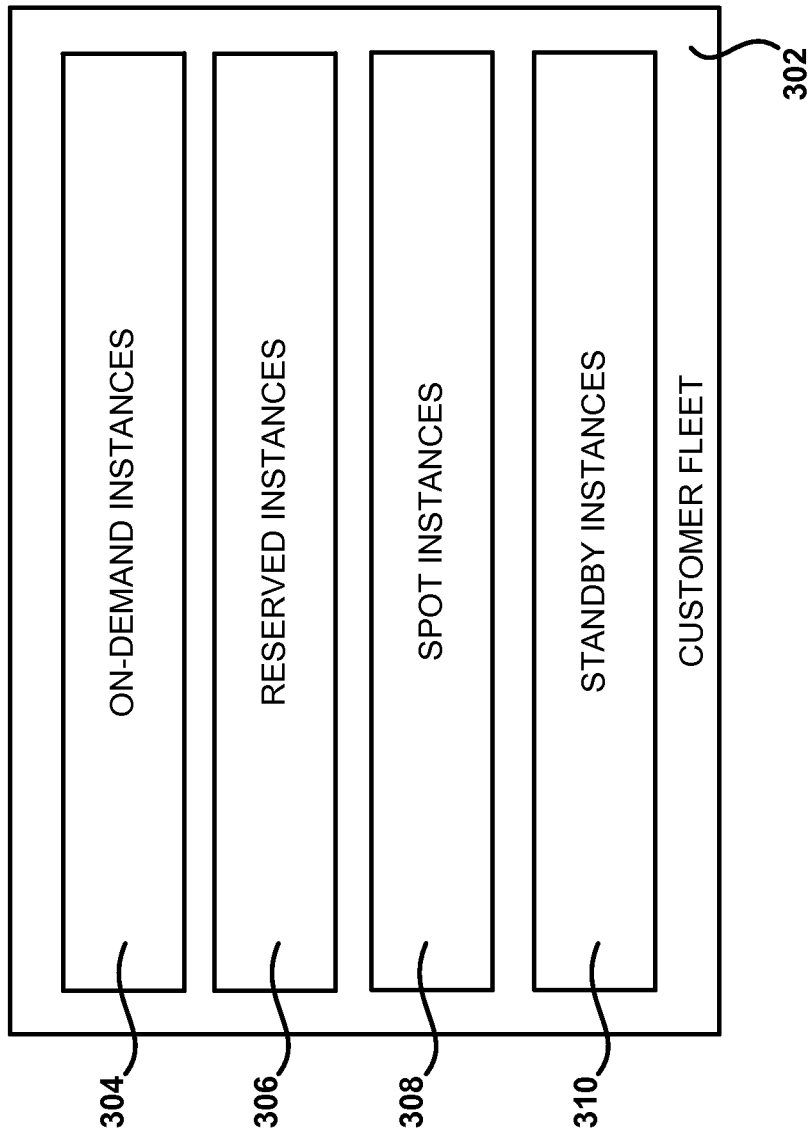
FIG. 3 is a block diagram illustrating various types of instances of computing resources that might be found in a customer fleet executing in a PES, according to embodiments disclosed herein.

FIG. 3 is a block diagram illustrating several types of instances 206 of computing resources that might be utilized in a customer fleet 302 to implement an application, according to embodiments disclosed herein. As used herein, the term "fleet" refers to all of the instances purchased and/or operated by a customer of the PES platform 108. As shown in FIG. 3, the instances provided by the PES platform 108 may be on-demand instances 304, reserved instances 306, spot instances 308, and standby instances 310. Other types of instances not shown in FIG. 3 or described herein might also be provided.

The on-demand instances 304, which might also be referred to herein as "regular" instances, are instances that are paid for and in active use by a customer. The on-demand instances 304 allow customers of the PES platform 108 to pay for capacity per unit of time, such as an instance-hour, without requiring a long-term commitment. This frees the customer from the costs and complexities of planning, purchasing, and maintaining hardware and transforms what are commonly large fixed costs into much smaller variable costs.

The reserved instances 306 are instances of a computing resource that are reserved for a customer in exchange for a payment. The reserved instances 306 provide the customer the option to make a one-time payment for each instance they want to reserve. In turn, the customer may receive a significant discount on the hourly usage charge for the reserved instances 306 as compared to the on-demand instances 304. After the customer makes a one-time payment for the reserved instances 306, the reserved instances 306 are reserved for the customer and the customer has no further obligation. The customer may choose to run the reserved instances 306 for the discounted usage rate for the duration of a chosen term. If the customer does not use the reserved instances 306, the customer will not pay usage charges on these instances.

The spot instances 308 allow customers to bid on unused capacity in the PES platform 108. The customer can run the spot instances 308 for as long as their bid exceeds a current market price, referred to herein as the spot instance market price, which may fluctuate based upon supply and demand. The spot instances 308 may be terminated if a customer's maximum bid no longer exceeds the current spot instance market price.

In order to obtain the spot instances 308, the customer places a request for the spot instances 308 that specifies the desired number of spot instances 308 and the maximum price the customer is willing to pay per instance hour. If the customer's maximum price bid exceeds the current spot instance market price for the spot instances 308, the customer's request will be fulfilled and the customer's spot instances 308 will run until either the customer chooses to terminate them or the market price increases above the customer's maximum price (whichever is sooner). Various components operating within the PES platform 108 may manage the market for the spot instances 308, including setting the current spot instance market price for the spot instances 308.

The standby instances 310 are spot instances 308 that have been acquired on behalf of a customer and that are made ready for near immediate use by the customer in the manner described herein. The price charged for the standby instances 310 is typically less than the price charged for the on-demand instances 304, since the standby instances 310 may be terminated in the same manner as the spot instances 308. In one embodiment, the standby instances 310 are priced higher than the spot instances 308 and the reserved instances 306, but lower than the on-demand instances 304. It should be appreciated, however, that the various pricing mechanisms described above for the on-demand instances 304, reserved instances 306, spot instances 308, and standby instances 310 are merely illustrative and that other mechanisms may be utilized to set the pricing for the various instance types. It should also be appreciated that the embodiments disclosed herein for launching virtual machine instances may be utilized to launch any of the instance types shown in FIG. 3 and other types of instances not shown in FIG. 3.

Figure 4:
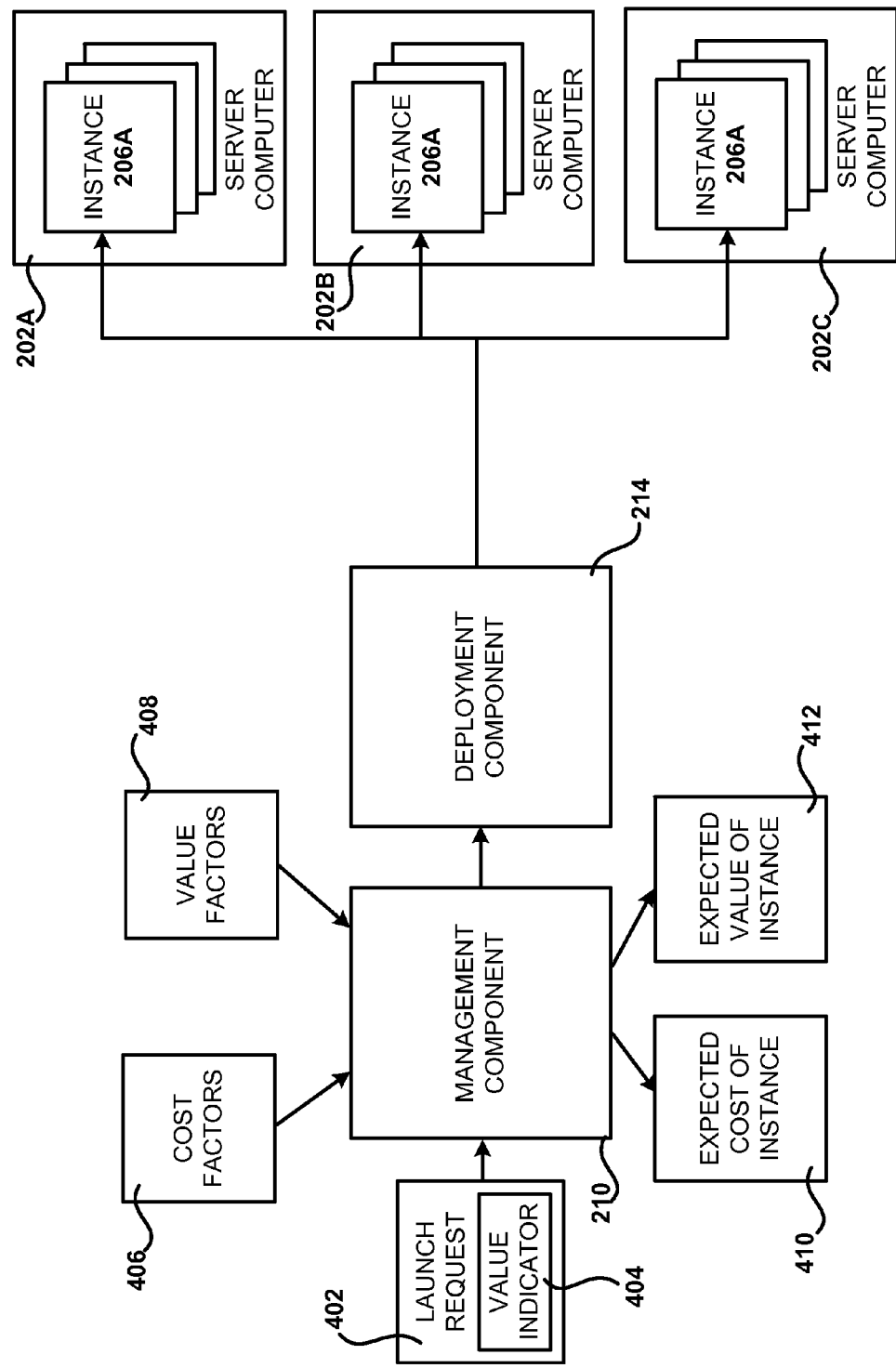
FIG. 4 is a computing system diagram showing aspects of several software components disclosed herein for executing a virtual machine instance in a PES, according to embodiments disclosed herein.

FIG. 4 is a computing system diagram showing aspects of several software components disclosed herein for executing a virtual machine instance in a PES platform 108, according to embodiments disclosed herein. As discussed briefly above, the PES platform 108 includes a management component 210 and a deployment component 214 in one embodiment disclosed herein. As also discussed briefly above, the management component 210 is configured to receive requests from customers or other users of the PES platform 108 (which may be referred to herein individually or collectively as a "requestor" or "requestors") to launch virtual machine instances, such as the virtual machine instance 206A. Such a request is illustrated in FIG. 4 as the launch request 402.

As also illustrated in FIG. 4, a launch request 402 might include a value indicator 404 provided by the requestor making the launch request 402. The value indicator 404 provides an indication of the value to the requestor making the request to launch the virtual machine instance 206A. For example, a customer of the PES 108 making the launch request 402 might indicate a number on an arbitrary scale (1-10, for instance) indicating the importance to them of the virtual machine instance 206A to be launched. The value indicator 404 might also be obtained, or inferred, from other types of customer or requestor-provided data. For instance, the price that a customer is willing to pay for the virtual machine instance 206A to be launched may be utilized as an indicator of the value of the instance 206A to the customer. The value of the instance 206A to the requestor might also be specified in other direct or indirect ways. As will be described in greater detail below, the value indicator 404 may be utilized in calculating an expected value 412 of a virtual machine instance 206A for which a launch request 402 has been received.

In response to receiving a launch request 402, the management component 210 is configured in one embodiment to compute an expected cost 410 of the instance 206A and an expected value 412 of the instance 206A. In order to compute the expected cost 410, the management component 210 might utilize one or more cost factors 406. The cost factors 406 are monetary or non-monetary factors that indicate the cost of launching and executing the virtual machine instance 206A to the operator of the PES platform 108. For example, the cost factors 406 might include the actual monetary costs associated with launching and executing the virtual machine instance 206A, such as the costs of hardware and software for executing the instance 206A, the cost of electricity for powering the server computer that executes the instance 206A, the cost of the real estate and facilities for housing the hardware executing the instance 206A, the cost of personnel to operate and maintain the hardware and software, and other actual monetary costs associated with executing the instance 206A.

The cost factors 406 might also include the opportunity cost associated with launching and executing the virtual machine instance 206A. For example, if executing the virtual machine instance 206A might cause the PES platform 108 to become capacity constrained and unable to launch another, more profitable virtual machine instance, then there is a quantifiable opportunity cost associated with launching and executing the virtual machine instance 206A. Other types of opportunity costs might also be quantified and utilized in the computation of the expected cost 410 of executing the instance 206A.

The cost factors 406 might also include a cost of risk associated with launching and executing the virtual machine instance 206A. For example, the management component 210 might determine that the instance 206A can only be launched on the same server computer 202 and/or in the same data center 102 that is currently used to execute another instance for the same customer. In this case, the possibility exists of a correlated failure that would cause both the new instance 206A and the other instance to fail at the same time. Such a correlated failure could be very expensive to the customer and, consequently, launching the new instance 206A under these circumstances might have a high cost of risk. The management component 210 might quantify the cost of risk and utilize this cost when computing the expected cost 410 of launching the instance 206A.

The cost factors 406 might also include a cost of lost goodwill as a result of launching and executing the virtual machine instance 206A. For instance, the management component 210 might determine that the quality of service that can be provided to the new instance 206A, such as the amount of CPU and network bandwidth that can be provided to the instance 206A. If the instance 206A cannot be executed by the PES platform 108 in a performant manner, the customer that submitted the launch request 402 might be dissatisfied. Alternately, execution of the instance 206A might result in performance degradation that results in other customers of the PES platform 108 being dissatisfied. As a result, the operator of the PES platform 108 might suffer an actual and quantifiable loss of goodwill as a result of executing the virtual machine instance 206A. The management component 210 might quantify this loss of goodwill as a monetary or non-monetary value and utilize this value in the computation of the expected cost 410 of executing the instance 206A.

It should be appreciated that the cost factors 406 described above are merely illustrative and that more or fewer cost factors 406 might be utilized when computing the expected cost 410 of the instance 206A. Additionally, costs factors 406 other than those described herein might also be utilized to compute the expected cost 410. The cost factors 406 might also be weighted in various embodiments.

In order to compute the expected value 412, the management component 210 might utilize one or more value factors 408. The value factors 408 are monetary or non-monetary factors that indicate the value of launching and executing the virtual machine instance 206A to the customer and/or the operator of the PES platform 108. For example, the value factors 408 might include the expected income associated with the execution of the virtual machine instance 206A. Specifically, the income received from the customer that submitted the launch request 402 for execution of the virtual machine instance 206A may be utilized as a value factor 408 when computing the expected value 412 of the instance 206A.

The value factors 408 might also include any indirect income associated with the execution of the virtual machine instance 206A. For example, if the operator of the PES 108 also operates an e-commerce Web site or other type of income-producing site on the PES 108, the launch and execution of the virtual machine instance 206A might produce income to the operator. All or a portion of this income might be utilized as one of the value factors 408 when computing the expected value 412 of the instance 206A.

The value factors 408 might also include the value of any goodwill gained from execution of the virtual machine instance 206. For example, the launch and execution of the instance 206A might result in positive, quantifiable goodwill to the operator of the PES platform 108 if the quality of service provided is very high. This goodwill might be utilized by the management component 210 when computing the expected value 412 of the instance 206A.

It should be appreciated that the value factors 408 described above are merely illustrative and that more or fewer value factors 408 might be utilized when computing the expected value 412 of the instance 206A. Additionally, value factors 408 other than those described herein might be utilized to compute the expected value 408. The value factors 408 might also be weighted in various embodiments.

It should also be appreciated that the expected cost 410 and the expected value 412 of the instance 206A might be computed over an expected execution lifetime of the instance 206A. In this regard, the management component 210 might be configured to compute the expected execution lifetime of the instance 206A. The lifetime of the instance 206A may be computed, for example, based upon historical behavior of the customer of the PES 108 that submitted the launch request 402, historical behavior of an aggregate group of customers of the PES 108, or in another manner. The customer submitting the launch request 402 might also explicitly state the expected execution lifetime of the instance 206A. The expected cost 410 and expected value 412 might also be computed over time periods other than the expected execution lifetime of the instance 206A in other embodiments.

As mentioned above, the value factors and cost factors might be expressed as monetary values or non-monetary values. When expressed as non-monetary values, any arbitrary scale may be utilized to express the values. For example, the cost associated with the execution of an instance may be specified on a scale from zero to one. Other types of non-monetary scales might also be defined to express the cost factors and the value factors. Additionally, the non-monetary values might also be derived from or based upon monetary values in other embodiments.

According to various embodiments, the management component 210 might compute the expected cost 410 and the expected value 412 for various execution slots for executing the instance 206A within the PES platform 108. For example, when a customer submits a launch request 402, the management component 210, the deployment component 214, or another component might identify one or more execution slots for executing the new instance 206A. The selection of slots for executing the new instance 206A might include identifying one or more appropriate server computers 202 in one or more data centers 102 upon which the new instance 206A may be executed. The expected cost 410 and expected value 412 might then be computed for each of the identified execution slots using information unique to each of the slots. For instance, different slots might have different operating costs or associated software licensing fees that might be utilized when calculating the expected cost 410. Similarly, different slots might generate different amounts of income that can be reflected in the expected value 412 of the instance.

Once the management component 210 has computed the expected cost 410 and the expected value 412 from the launch and execution of an instance, the management component 210 utilizes these values to determine whether to grant or deny the launch request 402. For example, the management component 210 may permit the instance 206A to be launched on the PES 108 only if the computed expected value 412 from executing the virtual machine instance 206A exceeds the computed expected cost 410 of executing the virtual machine instance 206A over its expected execution lifetime. In other embodiments, the management component 210 may permit the instance 206A to be launched on the PES 108 only if the computed expected cost 410 of executing the virtual machine instance 206A is less than a threshold percentage of the computed expected value 412 from executing the virtual machine instance 206A.

If the management component 210 determines that the launch request 402 is to be granted, the management component 210 might instruct the deployment component 214 to launch the virtual machine instance 206A. In turn, the deployment component 214 will launch and execute the virtual machine instance 206A according to a configuration provided by the customer that submitted the launch request 402, as discussed above. For example, the deployment component 214 might cause the instance 206A to be launched and executed on one of the server computers 202A-202C within the PES platform 108. Additional details regarding these processes will be provided below with regard to FIGS. 5-7.

Figure 5:
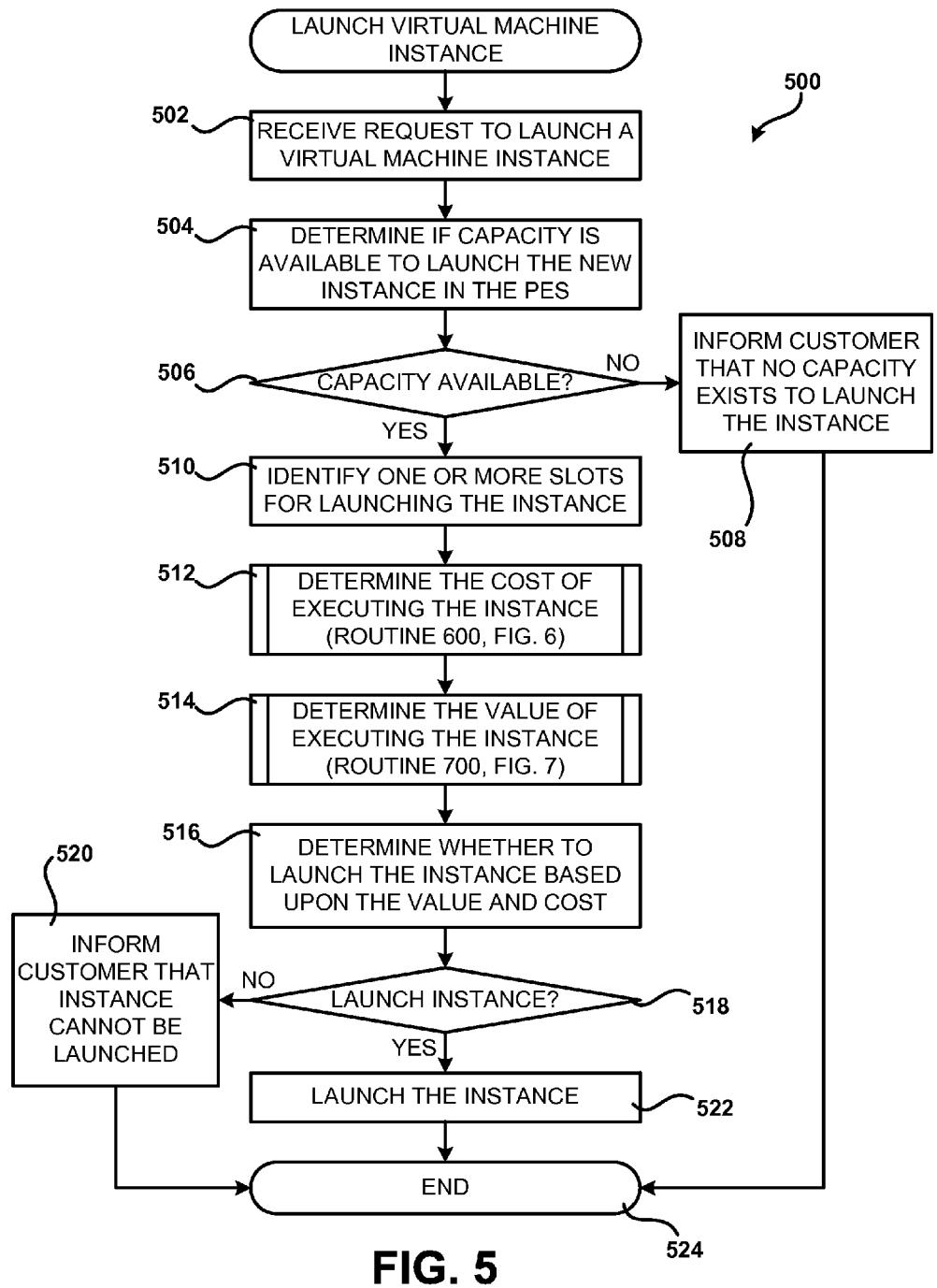
FIG. 5 is a flow diagram showing one illustrative routine for launching a virtual machine instance in a PES, according to one embodiment disclosed herein.
Figure 6:
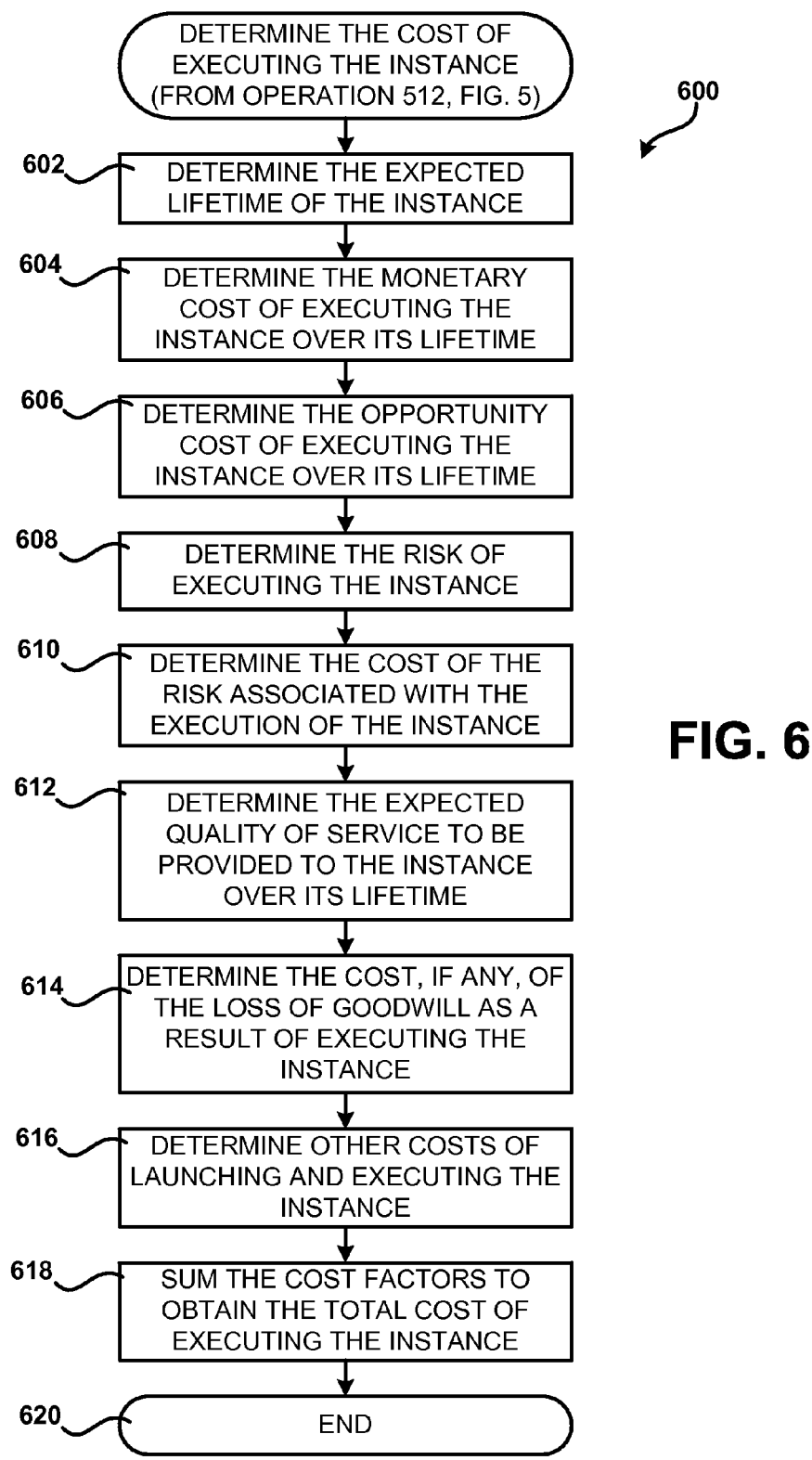
FIG. 6 is a flow diagram showing one illustrative routine for computing an expected cost associated with the execution of a virtual machine instance in a PES, according to one embodiment disclosed herein.
Figure 7:
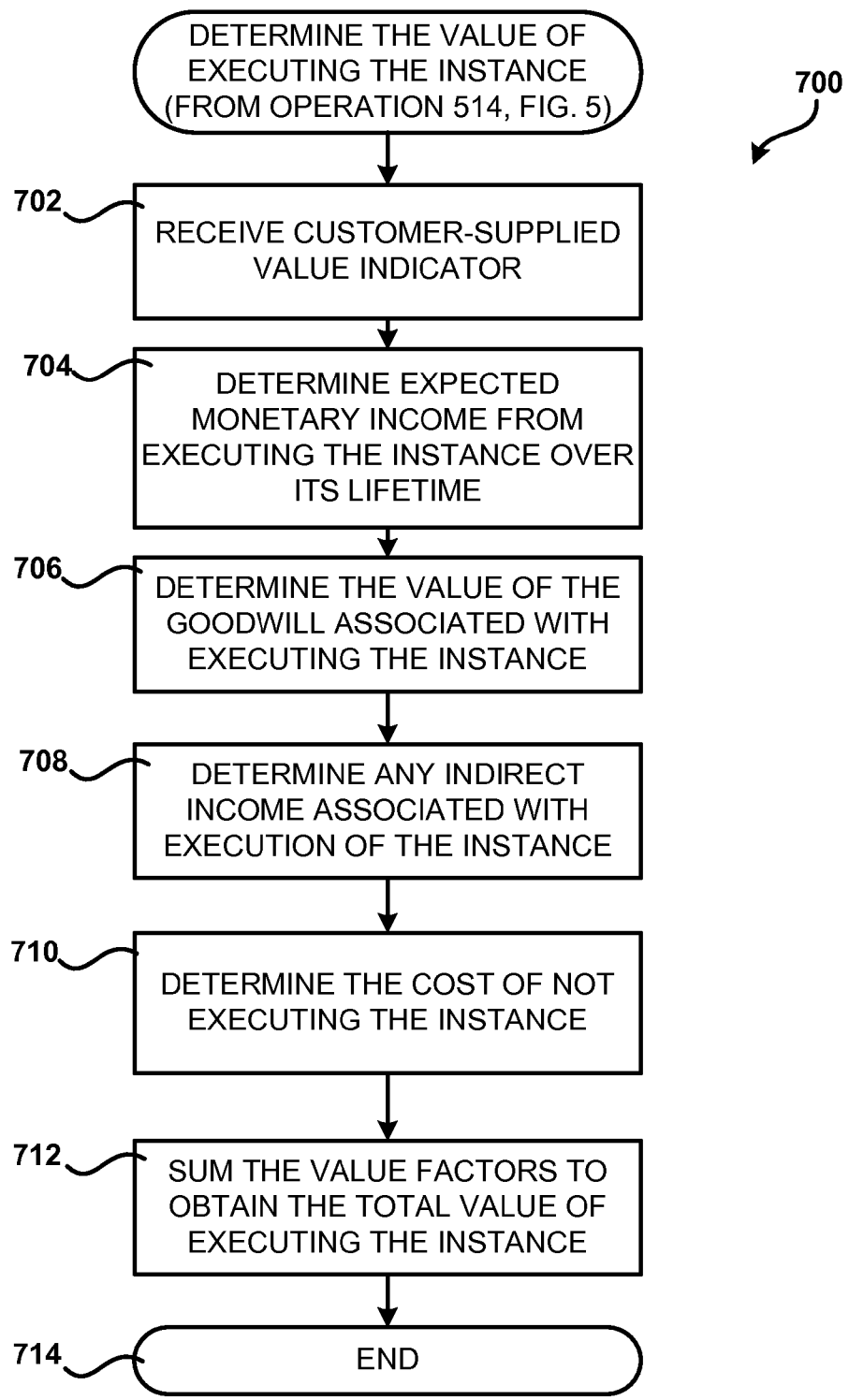
FIG. 7 is a flow diagram showing one illustrative routine for computing an expected value associated with the execution of a virtual machine instance in a PES, according to one embodiment disclosed herein.

FIGS. 5-7 are flow diagrams showing several illustrative routines for launching a virtual machine instance 206 in a PES platform 108, according to embodiments disclosed herein. It should be appreciated that the logical operations described herein with respect to FIGS. 5-7 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 5 is a flow diagram showing a routine 500 illustrating aspects of one mechanism for launching a virtual machine instance 206 in the PES platform 208. The routine 500 is performed by the management component 210 in the embodiment described below with regard to FIG. 5. It will be appreciated that another module or component may also perform the routine 500, such as the deployment component 214 or the auto scaling component 212. A combination of modules and components might also perform the routine 500.

The routine 500 begins at operation 502, where the management component 210 receives a launch request 402. As discussed above with regard to FIG. 4, the launch request 402 might also include a value indicator 404 indicating a value of the execution of the virtual machine instance 206 to the customer of the PES 108 that provided the launch request 402. The routine 500 then proceeds to operation 504.

At operation 504, the management component 210 determines whether capacity is available in the PES 108 to launch the instance 206 requested by the launch request 402. To make this determination, the management component 210 might communicate with the deployment component 214 or another component within the PES 108 that maintains data regarding the available capacity of the PES 108. If no capacity is available, the routine 500 proceeds from operation 506 to operation 508, where the customer that submitted the launch request 402 is informed that no capacity exists in the PES 108 to grant the launch request 402. The customer might also be instructed to re-submit the launch request 402 at a later time. The routine 500 then proceeds from operation 508 to operation 524, where it ends.

If there is sufficient computing capacity within the PES 108 to grant the launch request 402, the routine 500 proceeds from operation 506 to operation 510. At operation 510, the management component 210 identifies one or more slots within the PES 108 upon which the instance for which execution has been requested may be executed. As mentioned above, the expected cost 410 and expected value 412 might be computed separately for each of the identified slots. The instance might then be executed on the slot having the best cost to value ratio. Other metrics might also be determined to determine which of the available slots the instance should be executed on.

From operation 510, the routine 500 proceeds to operation 512 where the management component 210 computes the expected cost 410 of executing the instance 206 utilizing the cost factors 406. One illustrative routine 600 will be described below with regard to FIG. 6 for computing the expected cost 410 of executing the instance.

From operation 512, the routine 500 proceeds to operation 514 where the management component 210 computes the expected value 412 of executing the instance 206 utilizing the value factors 408. One illustrative routine 700 will be described below with regard to FIG. 7 for computing the expected value 412 of executing the instance.

From operation 514, the routine 500 proceeds to operation 516, where the management component 210 determines whether to grant the launch request 402 based upon the expected cost 410 and the expected value 412 from executing the instance. As discussed above, the management component 210 may permit the instance to be launched only if the expected value 412 exceeds the expected cost 410. In another embodiment, the management component 210 may permit the instance to be launched only if the expected cost 410 is less than a threshold percentage of the expected value 412. For example, the management component 210 might grant the launch request 402 only if the expected cost 410 is 10% or less of the expected value 412. Other models might also be utilized to specify the relationship between the expected cost 410 and the expected value 412 under which a launch request 402 should be granted.

If the management component 210 determines that the launch request 402 cannot be granted, the routine 500 proceeds from operation 518 to operation 520. At operation 520, the management component 210 informs the customer that submitted the launch request 402 that the request cannot be granted. The routine 500 then proceeds from operation 520 to operation 524, where it ends.

If the management component 201 determines that the launch request 402 can be granted, the routine 500 proceeds from operation 518 to operation 522. At operation 522, the management component 210 instructs the deployment component 214 to launch the requested instance. The deployment component 214, in turn, causes the instance to be launched on one of the server computers 202 in the PES platform 108 utilizing the launch configuration specified by the customer. The routine 500 then proceeds from operation 522 to operation 524, where it ends.

FIG. 6 is a flow diagram showing one illustrative routine 600 for computing an expected cost 410 associated with the execution of a virtual machine instance 206 in a PES platform 108, according to one embodiment disclosed herein. The routine 600 begins at operation 602, where the management component 210 determines the expected lifetime of the instance for which execution has been requested. As mentioned briefly above, the expected lifetime might be explicitly specified by the customer submitting the launch request 402, might be estimated based upon the lifetime of other instances associated with the customer, or might be determined in other ways.

From operation 602, the routine 600 proceeds to operation 604, where the management component 210 determines the expected monetary costs of executing the instance over its expected lifetime. As mentioned above, the monetary costs might include the actual costs for hardware or software, electricity, facilities, personnel, and other resources necessary to execute the instance over the course of its lifetime. Once the monetary costs of executing the instance have been determined, the routine 600 proceeds from operation 604 to operation 606.

At operation 606, the management component 210 determines the opportunity cost of launching and executing the instance. As mentioned above, launching an instance might prevent the PES 108 from executing another more valuable instance for the same or a different customer. In this case, the operator of the PES 108 will suffer an actual, quantifiable opportunity cost if the launch request 402 is granted. The management component 210 quantifies this opportunity cost at operation 606.

From operation 606, the routine 600 proceeds to operation 608, where the management component 210 estimates any risk associated with granting the launch request 402. For instance, as discussed above, a risk of correlated failure might be present if an instance is launched on the same server or data center as another instance for the same customer. In such a case, the management component 210 might quantify the risk of granting the launch request 402 based upon the location of the available slots for launching the requested instance and other currently executing instances owned by the customer that submitted the launch request 402.

From operation 608, the routine 600 proceeds to operation 610, where the management component 210 determines the cost of the risk associated with granting the launch request 402. For example, the management component 210 might multiply the cost associated with a correlated failure by the risk of the correlated failure determined at operation 608 in order to determine the estimated cost of the risk. Other mechanisms might also be utilized to determine a cost of risk associated with launching a virtual machine instance.

From operation 610, the routine 600 proceeds to operation 612, where the management component 210 determines the expected quality of service to be provided to the new instance if the launch request 402 is granted. For example, the management component 210 might communicate with the deployment component 214 or another component executing within the PES 108 in order to determine the available computing resources or network bandwidth available to the new instance.

The routine 600 then continues to operation 614, where the management component 614 determines the cost of the loss of goodwill, if any, as a result of executing the instance at the level of service identified at operation 612. For example, if the instance executes slowly or the network bandwidth is limited, the customer that submitted the launch request 402 may be dissatisfied and the operator of the PES 108 might consequently incur a loss of goodwill. The management component 210 quantifies the loss of goodwill, if any, at operation 614.

From operation 614, the routine 600 proceeds to operation 616, where the management component 210 determines any other costs of executing the new instance. The routine 600 then proceeds to operation 618, where the management component 210 sums the cost factors 406 computed at operations 604-616 to generate an expected cost 410 of executing the instance. As mentioned above, each of the cost factors 406 might also have an associated weight that is utilized prior to summing the costs factors 406. Other types of models might also be utilized to generate the expected cost 410 of the instance using the cost factors 406 in other embodiments. From operation 618, the routine 600 proceeds to operation 620, where it ends.

FIG. 7 is a flow diagram showing one illustrative routine 700 for computing an expected value 412 associated with the execution of a virtual machine instance 206 in a PES platform 108, according to one embodiment disclosed herein. The routine 700 begins at operation 702, where the management component 210 receives a customer-supplied value indicator 404. As discussed above, the value indicator 404 might be received with the launch request 402 or might be provided by the customer submitting the launch request 402 in another manner. As also mentioned above, the value of the launch and execution of the instance might also be determined in other ways through direct or indirect indicators. For example, the price the customer is willing to pay to execute the instance might be utilized as a direct indicator of the value of the instance to the customer.

From operation 702, the routine 700 proceeds to operation 704, where the management component 210 determines the expected income associated with the execution of the virtual machine instance over its expected lifetime. The routine 700 then proceeds to operation 706, where the management component 210 quantifies the value of any goodwill gained from execution of the virtual machine instance 206. For example, the launch and execution of the instance might result in positive, quantifiable goodwill to the operator of the PES platform 108.

From operation 706, the routine 700 proceeds to operation 708, where the management component 210 quantifies the value of any indirect income associated with the execution of the requested virtual machine instance. For example, if the operator of the PES 108 also operates an e-commerce Web site or other type of income-producing site on the PES 108, the launch and execution of the virtual machine instance might produce income to the operator. The management component 210 quantifies this value at operation 708.

From operation 708, the routine 700 proceeds to operation 710, where the cost of not executing the instance may be determined. For example, there may be a significant cost of lost goodwill if the management component 210 determines that the instance should not be launched. A highly valued customer may be upset that the instance cannot be executed as request and, as a result, there may be a significant loss of goodwill. There might also be other costs associated with not executing the instance. These costs may be computed and utilized to compute the value of executing the instance in one embodiment.

From operation 710, the routine 700 proceeds to operation 710 where the management component 210 sums the value factors 408 computed at operations 702-712 to generate an expected value 412 of executing the instance. As mentioned above, each of the value factors 408 might also have an associated weight that is utilized prior to summing the value factors 408. Other types of models might also be utilized to generate the expected value 214 of the instance using the value factors 408 in other embodiments. From operation 712, the routine 700 proceeds to operation 714, where it ends.

Figure 8:
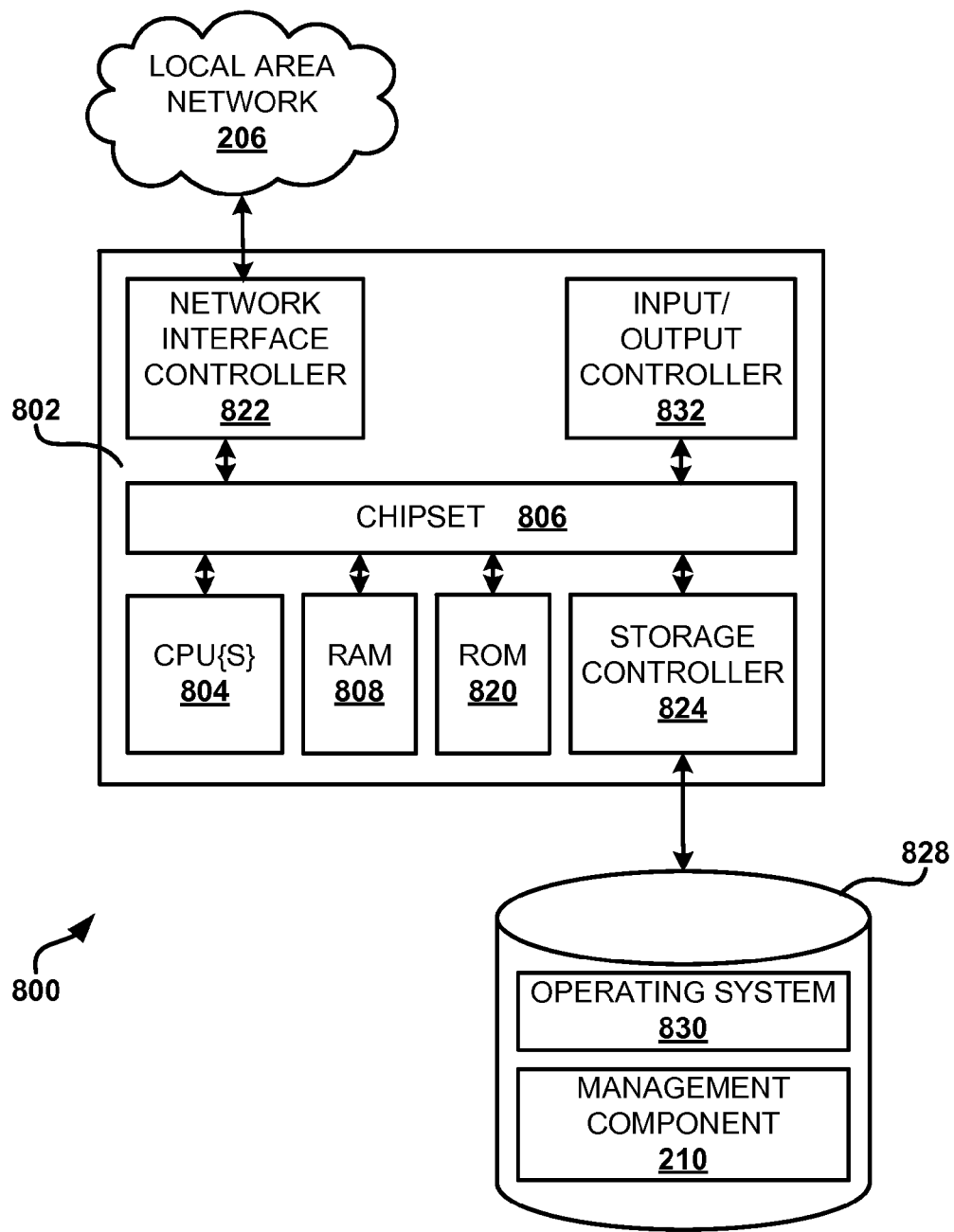
FIG. 8 is a computer architecture diagram showing an illustrative computer hardware architecture for implementing the various computing devices described in embodiments presented herein.

FIG. 8 shows an example computer architecture for a computer 800 capable of executing the software components described above. The computer architecture shown in FIG. 8 illustrates a conventional server computer, workstation, desktop computer, laptop, tablet, network appliance, PDA, e-reader, digital cellular phone, or other computing device, and may be utilized to execute any aspects of the software components presented herein described as executing within the data centers 102A-102N, on the server computers 202A-202N, on the customer computing system 104, or on any other computing system mentioned herein.

The computer 800 includes a baseboard, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 are standard programmable processors that perform arithmetic and logical operations necessary for the operation of the computer 800.

The CPUs 804 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard. The chipset 806 may provide an interface to a random access memory ("RAM") 808, used as the main memory in the computer 800. The chipset 806 may further provide an interface to a computer-readable storage medium such as a read-only memory ("ROM") 820 or non-volatile RAM ("NVRAM") for storing basic routines that that help to startup the computer 800 and to transfer information between the various components and devices. The ROM 820 or NVRAM may also store other software components necessary for the operation of the computer 800 in accordance with the embodiments described herein.

The computer 800 may operate in a networked environment using logical connections to remote computing devices and computer systems through the network 206. The chipset 806 may include functionality for providing network connectivity through a network interface controller ("NIC") 822, such as a gigabit Ethernet adapter. The NIC 822 is capable of connecting the computer 800 to other computing devices over the network 206. It should be appreciated that multiple NICs 822 may be present in the computer 800, connecting the computer to other types of networks and remote computer systems.

The computer 800 may be connected to a mass storage device 828 that provides non-volatile storage for the computer. The mass storage device 828 may store system programs, application programs, other program modules, and data, which have been described in greater detail herein. The mass storage device 828 may be connected to the computer 800 through a storage controller 824 connected to the chipset 806. The mass storage device 828 may consist of one or more physical storage units. The storage controller 824 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 828 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 828 is characterized as primary or secondary storage, and the like.

For example, the computer 800 may store information to the mass storage device 828 by issuing instructions through the storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 828 by detecting the physical states or characteristics of one or more particular locations within the physical storage units.

In addition to the mass storage device 828 described above, the computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 828 may store an operating system 830 utilized to control the operation of the computer 800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 828 may store other system or application programs and data utilized by the computer 800, such as the management component 210, and/or the other software components described above.

In one embodiment, the mass storage device 828 or other computer-readable storage media is encoded with computer-executable instructions which, when loaded into the computer 800, transforms the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the routines 500, 600, and 700, described with regard to FIGS. 5, 6, and 7, respectively.

The computer 800 may also include an input/output controller 832 for receiving and processing input from a number of input devices, such as a keyboard, a mouse, a touchpad, a touch screen, an electronic stylus, or other type of input device. Similarly, the input/output controller 832 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for launching virtual machine instances in a PES have been presented herein. It should be appreciated that although the embodiments disclosed herein have been described in the context of launching virtual machine instances in a PES, the various aspects described herein might also be utilized to launch other types of software in other types of environments. The embodiments disclosed herein might also be utilized when instantiating other types of computing resources for customer use in a PES, and in other types of environments.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for launching new virtual machine instances in a programmable execution service (PES) that includes one or more host computer systems configured to host virtual machine instances, the method comprising performing computer-implemented operations for:

receiving a request, at a first server computer over a network, to launch a new virtual machine instance in the PES, the request containing data describing a configuration of the new virtual machine instance;

determining, by the first server computer, a list of host computer systems within a data center that include capacity available to host the new virtual machine instance based at least in part on the configuration of the virtual machine instance;

computing, by the first server computer and for each host computer system in the list, an expected cost of executing the new virtual machine instance based upon one or more cost factors and computing an expected value from executing the new virtual machine instance based upon one or more value factors, the expected cost and expected value being computed over an expected lifetime of the new virtual machine instance;

computing, by the first server computer, a ratio of an expected cost and an expected value for each host computer system in the list;

selecting, by the first server computer, a host computer system based at least in part on the computed ratio for each host computer system in the list; and automatically instantiating the new virtual machine instance on the selected host computer system.

2. The computer-implemented method of claim 1, wherein the cost factors comprise one or more of actual monetary costs associated with executing the new virtual machine instance, opportunity costs associated with executing the new virtual machine instance, a cost of risk associated with executing the new virtual machine instance, or a cost of lost goodwill associated with executing the new virtual machine instance.

3. The computer-implemented method of claim 2, wherein the value factors comprise one or more of expected income from execution of the new virtual machine instance, value of goodwill associated with execution of the new virtual machine instance, or indirect income associated with execution of the new virtual machine instance.

4. The computer-implemented method of claim 3, wherein the request to launch the new virtual machine instance in the PES further comprises a value indicator that indicates a value of the execution of the new virtual machine instance to a requestor requesting the launch, and wherein computing an expected value from executing the new virtual machine instance based upon the one or more value factors comprises computing the expected value at least in part based upon the value indicator.

5. The computer-implemented method of claim 4, wherein the request to launch the new virtual machine instance in the PES is granted only if the computed expected cost of executing the new virtual machine instance is less than a threshold percentage of the computed expected value from executing the new virtual machine instance.

6. An apparatus for launching virtual machine instances in a programmable execution service (PES), the apparatus comprising:
   at least one processor; and
   a memory storing program code executable on the processor which, when executed, will cause a computer system to:
   receive a request to launch a virtual machine instance in the PES, the request containing data describing a configuration of the virtual machine instance;
   determine, by the computer system, a list of host computer systems within a data center that include capacity available to host a virtual machine instance based at least in part on the configuration of the virtual machine instance;
   compute an expected cost of executing the virtual machine instance over an expected lifetime of the virtual machine instance on the host computer systems in the list;
   compute an expected value from executing the virtual machine instance over the expected lifetime on the host computer systems in the list;
   determine whether to launch the virtual machine instance in the PES based upon the computed expected cost of the virtual machine instance and the computed expected value from the virtual machine instance; and
   select, by the computer system, a host computer system based upon the computed expected cost of the virtual machine instance and the computed expected value from the virtual machine instance on which to launch the virtual machine instance; and
   automatically launch the virtual machine instance on the selected host computer system.

7. The apparatus of claim 6, wherein the expected cost of the virtual machine instance over the expected lifetime is computed based upon one or more cost factors, the cost factors comprising one or more of actual monetary costs associated with executing the virtual machine instance, opportunity costs associated with executing the virtual machine instance, a cost of risk associated with executing the virtual machine instance, or a cost of lost goodwill associated with executing the virtual machine instance.

8. The apparatus of claim 7, wherein the expected value is computed based upon one or more value factors, the value factors comprising one or more of a requestor-provided value indicator, expected income from execution of the virtual machine instance, value of goodwill associated with execution of the instance, or indirect income associated with execution of the virtual machine instance.

9. The apparatus of claim 8, wherein the virtual machine instance is launched in the PES only if the computed expected value from executing the virtual machine instance exceeds the computed expected cost of executing the virtual machine instance.

10. The apparatus of claim 8, wherein the virtual machine instance is launched in the PES only if the computed expected cost of executing the virtual machine instance is less than a threshold percentage of the computed expected value from executing the virtual machine instance.

11. The apparatus of claim 8, wherein the expected cost of executing the virtual machine instance and the expected value from executing the virtual machine instance are expressed as monetary values.

12. The apparatus of claim 8, wherein the expected cost of executing the virtual machine instance and the expected value from executing the virtual machine instance are expressed as non-monetary values.

13. A non-transitory computer-readable storage medium having computer-executable instructions stored thereupon which, when executed by a computer, cause the computer to:
   receive a request to launch a virtual machine instance, the request containing data that describes a configuration of the virtual machine instance;
   in response to receiving the request, determine a list of host computer systems within a data center that include capacity available to host the virtual machine instance;
   compute an expected cost of executing the virtual machine instance on the host computer systems in the list and an expected value from executing the virtual machine instance on the host computer systems in the list;
   determine a ratio based upon the computed expected cost of executing the virtual machine instance on the host computer systems in the list and the computed expected value from executing the virtual machine instance on the host computer systems in the list;
   select a host computer system based at least in part on the ratio; and to
   automatically execute the virtual machine instance on the selected host computer system.

14. The non-transitory computer-readable storage medium of claim 13, wherein the expected cost is computed based upon one or more cost factors.

15. The non-transitory computer-readable storage medium of claim 14, wherein the cost factors comprise one or more of actual monetary costs associated with executing the virtual machine instance, opportunity costs associated with executing the virtual machine instance, a cost of risk associated with executing the virtual machine instance, or a cost of lost goodwill associated with executing the virtual machine instance.

16. The non-transitory computer-readable storage medium of claim 13, wherein the expected value is computed based upon one or more value factors.

17. The non-transitory computer-readable storage medium of claim 16, wherein the value factors comprise one or more of expected income from execution of the virtual machine instance, value of goodwill associated with execution of the instance, or indirect income associated with execution of the virtual machine instance.

18. The non-transitory computer-readable storage medium of claim 13, wherein the request to launch the virtual machine instance further comprises a requestor-provided value indicator indicating a value of the execution of the instance to the requestor, and wherein the expected value from executing the virtual machine instance is computed at least in part based upon the requestor-provided value indicator.

19. The non-transitory computer-readable storage medium of claim 13, wherein the expected cost of executing the virtual machine instance and the expected value from executing the virtual machine instance are computed over an expected lifetime of the virtual machine instance.

20. The non-transitory computer-readable storage medium of claim 13, having further computer-executable instructions stored thereupon which, when executed by a computer, cause the computer to grant the request to execute the virtual machine instance if the computed expected value from executing the virtual machine instance is greater than the computed expected cost of executing the virtual machine instance.

* * * * *